Nov. 17, 1953 J. R. ENGLISH 2,659,335
COMBINED INDICATING PLATE AND PULL WIRE
Filed Dec. 6, 1950 2 Sheets-Sheet 1
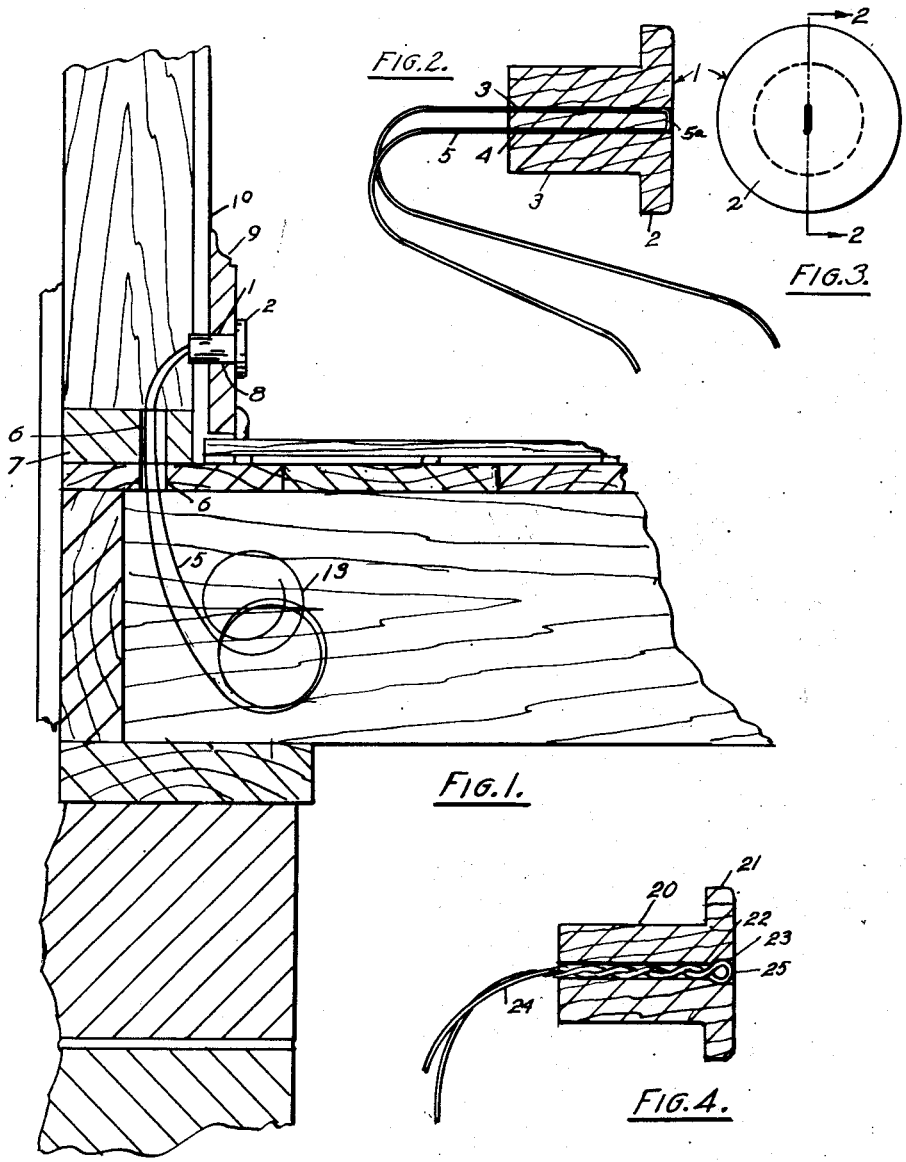
INVENTOR.
JOSEPH R. ENGLISH.
BY Nov. 17, 1953  J. R. ENGLISH  2,659,335
COMBINED INDICATING PLATE AND PULL WIRE
Filed Dec. 6, 1950  2 Sheets-Sheet 2

INVENTOR.
JOSEPH R. ENGLISH
BY

Patented Nov. 17, 1953

2,659,335

UNITED STATES PATENT OFFICE 2,659,335

COMBINED INDICATING PLATE AND PULL WIRE

Joseph R. English, Erie, Pa.

Application December 6, 1950, Serial No. 199,377

10 Claims. (Cl. 116—114)

This invention relates generally to a device for providing immediate or future additional electric wiring of a building for increasing the capacity of a wiring system or increasing facilities and more particularly to labeled or unlabeled appropriate indicating plug plates with mechanical type wires attached thereto, the wires extending through an aperture or a series of apertures defining a wireway to an accessible point in a building adjacent existent electric wiring capacity whereby a new outlet or other electric facility may be inexpensively placed in a predetermined period of time in any predetermined position in a building at any future time by pulling an electric wire or cable through the space provided and making suitable electrical connections.

In the construction of buildings, including the present construction of prefabricated buildings on an assembly line, it is desirable and almost necessary that provisions be made for additional outlets or capacity and connections including additional wiring after the initial construction of the building. In the past, it has been the practice, through lack of knowledge and high costs of the particular outlets and wiring desired, to provide a minimum number of outlets in the original plans and specifications of the building. The owner or tenant would then provide any other needed outlets with the necessary wiring at an excessive cost at a later date. This installation of the wiring at a later date is usually injurious to the building and often costs three to six times the amount of money that it would have cost had the wiring been installed originally due to the difficulty and gamble incident to cutting apertures and wireways into the already constructed building and often the preferred position desired for the outlet or fixture cannot be chosen. In installing the wiring, it requires the cutting away of walls, floors, or ceilings to cut apertures in the plates or joists of the building and in all instances, it is necessary to dispose the wiring and outlet in a position where it will go through the wall, floor, or ceiling and cause the least amount of cutting to install the wiring, thereby many times requiring the placing of an outlet in an undesired position. No predetermined costs or estimates can be secured to add outlets and wiring to an already constructed building due to the gamble on the time and material needed to complete the job. With my mechanical pull wire arrangement with indicating plates or plugs the gamble is removed and close estimates or actual firm bids may be obtained from wiring contractors by the owner. The cutting away of plastered walls is messy and many times it requires a major plaster repair and a complete paint job in the room because of the impossibility of doing a suitable patch paint job or because of falling plaster.

In general terms, I provide inexpensive indicating plates having mechanical wires attached thereto in predetermined positions in a wall, floor, or ceiling of a building where future outlets may be desired. My invention consists basically of a reasonably small indicating plate of pleasing appearance to blend in with the decorative scheme of a room which may be labeled or unlabeled, which may be disposed in the baseboard, in the side of a wall, a floor, or a ceiling with a mechanical pull wire attached thereto extending to the basement or attic or any other accessible portion of a building through pre-cut apertures or wireways for the purpose of pulling an electric wire through the pre-cut passage at some future time to the point in the wall, floor, or ceiling where the indicating plate is disposed. Electric capacity is usually available in the basement or attic thereof.

It is, accordingly, an object of my invention to provide an appropriate combined indicating plate and pull wire for disposal in the wall, floor, or ceiling of a building to indicate the presence of a passage or wireway in a building for an electric wire and for pulling an electric wire through a passage or wireway extending to existing electric capacity which is simple in construction, economical in cost, economical in manufacture, esthetic in appearance, and efficient in operation and installation.

Another object of my invention is to provide an appropriate indicating plate for disposal in or on the wall, floor, or ceiling of a building to which a mechanical double pull wire is attached so that if one wire breaks, a second wire is available.

Another object of my invention is to provide novel means for attaching a reversely bent wire to an indicating plate.

Another object of my invention is to provide a novel means to eliminate the gamble in time and material in the installation of an electrical outlet or connection and more specifically to dispense with all of the fishing and "comealong" devices now used to place a wire in an already constructed building.

Another object of my invention is to provide novel and practical means for placing additional electric wires and outlets and other electric facilities in predetermined positions in a building after the building has been constructed and the initial wiring completed.

Other objects of my invention will become evident from the following detailed description, taken in conjunction with the accompanying drawings, in which Fig. 1 is a side elevational view showing my novel indicating plate with a mechanical wire attached thereto disposed in a baseboard attached to the inside wall of a building;

Fig. 2 is a vertical sectional view of my novel indicating plate with a mechanical pull wire attached thereto.

Fig. 3 is an end elevational view of the indicating plate shown in Fig. 2.

Figure 8:
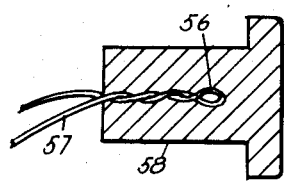
Figure 9:
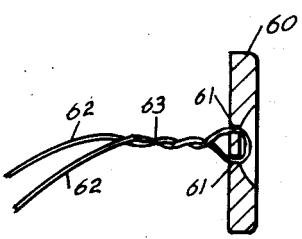

Figs. 4, 5, 6, and 7 are vertical sectional views of my novel indicating plate showing different means of attaching the pull wire thereto;

Fig. 8 is a vertical sectional view of my novel indicating plate showing the end of a reversely bent pull wire embedded therein; and Fig. 9 is a vertical sectional view of a modified form of my novel indicating plate with a mechanical pull wire attached thereto.

Referring now to the drawings, I show in Figs. 1, 2, and 3 a cylindrical plug 1 having an outwardly directed flange 2 on one end thereof and spaced, parallel, longitudinally extending apertures 3 and 4 longitudinally thereof. A strong, non-corrosive pull wire 5 is passed through the apertures 3 and 4 as shown in Fig. 2. The looped end of the wire 5 may be cut to form two wires if desired and the ends of the cut wires may be twisted at 5a to secure the wire 5 and plug 1 together. The free ends of the wire 5 are normally passed through a conventional passage or wireway shown for the purpose of illustration in Fig. 1 as extending through a vertically extending aperture 6 formed in a plate 7 and extended to the basement of a building. It will be readily understood that the wires 5 may be of any length and they may pass upwardly to an attic or to any other accessible point where electrical capacity is available so that wires may be pulled through the passageway or wireway and through the aperture 8 in the baseboard 9 at any future time. The free ends of the wire 5 are usually marked for identification and rolled at 13 to keep it out of the way until it is ready for use.

Fig. 4 is a modified form of my novel combined indicating plate and pull wire showing a cylindrical plug 20 with a flange 21 on the end thereof and an axially extending bore 22 with an enlarged counterbored end 23. A pull wire 24 is passed through the axially extending bore 22 and twisted to provide a looped end 25 which nests in the enlarged end 23 of the longitudinally extending bore 22 to hold the pull wire 24 in place. This type of attachment is particularly desirable where a wire is first placed through a wireway and the looped end of the wire is left extending from the wall and the plug 20 is attached thereto at a later time.

Figure 5:
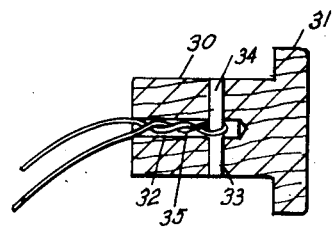

Fig. 5 is another modified form of my novel indicating plate and mechanical pull wire showing a cylindrical plug 30 with an outwardly directed flanged end 31, a longitudinally extending recess 32, and a transversely extending aperture 33. The looped end of the wire 35 is passed into the recess 32 and a pin 34 is extended through the transverse aperture 33 into the looped end of the wire 35.

Figure 6:
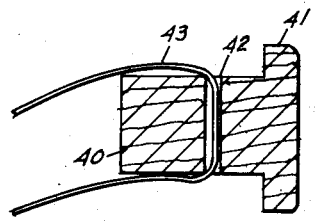

Fig. 6 is another modified form of my combined indicating plate and pull wire showing a cylindrical plug 40 with an outwardly directed flange 41 on the end thereof and a transversely extending aperture 42 through which a pull wire 43 is passed to attach it to the plug 40.

Figure 7:
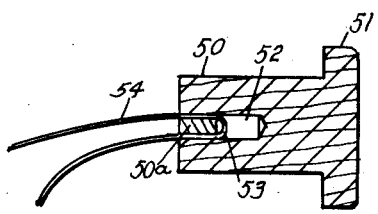

Fig. 7 is another modified form of my novel combined indicating plate and pull wire showing a cylindrical plug 50 having an outwardly directed flange 51 on the end thereof and an axially extending recess 52 on the opposite end thereof. The looped end 53 of the wire 54 is secured in the recess 52 of the plug 50 by a nail 50a or a like fastening device.

Fig. 8 shows the looped end 56 of a mechanical pull wire 57 embedded in a die cast or plastic plug 58.

Fig. 9 shows a disc 60 with two laterally spaced apertures 61. The ends 62 of the pull wire 63 are passed through the apertures 61 and twisted. The wire 63 may be two separate wires and twisted together where wire 63 is looped.

My novel combined indicating plate and pull wire may be made up complete ready for use or it may be assembled at the building site as conditions require. In the installation of my novel combined indicating plate and pull wire in a construction as shown in Fig. 1, where the pull wire is installed first and the indicating plate added thereto at a later time, the wire 5 is extended through the aperture 6 as shown in Fig. 1 and it is extended outwardly through the wall 10 of the building before the baseboard 9 is installed. When the baseboard 9 is installed, the aperture 8 is made therein in a predetermined position and the cylindrical plug 1 of the indicating plate is inserted in the aperture 8 after the wire 5 is attached thereto as shown in Figs. 4, 5, and 7. Where my combined indicating plate and pull wire is already assembled as in Figs. 2, 6, and 8, the plug is inserted in the aperture 8 in the baseboard 9 and the pull wire 5 is strung through the aperture 6 in the plate 7. Thus, the means for the easy and inexpensive installation of an outlet may be provided for electric clocks, razors, picture or other special lighting, a television unit, a garbage disposal unit under a sink, an electric dryer for clothes, a refrigerated food storage cabinet, electric ranges or other cooking equipment, outdoor lighting, Christmas lights, or any other electrical outlet or connection for any use desired. My novel indicating plate may be used in any portion of a wall such as an upper portion thereof providing an outlet for a clock or the like or it may be inserted in a floor or ceiling. The indicating plate may take the form of a disc as shown in Fig. 9 for use on a plastered wall or it may take any other suitable form. Suitable indicia may be placed on the exposed portion of the indicating plates by means of labels, suitable dies, direct printing, or handwriting. One or two wires may be used with any of the plugs described.

It will be evident from the foregoing description that my novel invention makes it possible to add outlets, additional electric capacity, and connections and necessary wiring in a completed building where desired quickly and inexpensively by providing novel means for indicating cut passageways, wireways, or holes in a building for use in future wiring. Mechanical pull wires extend through pre-formed passageways, holes, or wireways attached to the indicating means for pulling wires from an accessible point of existing electric capacity to a position where an outlet or connection is desired in a wall, floor, or ceiling, and furthermore, I have provided novel practical means for adding additional wiring or capacity to a building after it is originally wired and constructed without the usual gamble associated with fishing and working between walls already enclosed at a minimum of time, labor, and materials. The pull wires may extend to the basement, attic, or any other accessible point of existing electric capacity.

Various changes may be made in the specific embodiment of my invention without departing from the spirit thereof or from the scope of the appended claims.

What I claim is:

1. A combined indicating plate and pull wire comprising a cylindrical member having an outwardly directed flange on one end thereof for disposal in an aperture in a building element to indicate the location of a pre-formed passageway, and a double mechanical pull wire attached to said cylindrical member adapted to extend through a passageway in a building, said wire being adapted to be attached to an electrical conductor whereby said conductor can be pulled through said aperture.

2. A combined indicating plate and pull wire as set forth in claim 1 wherein said mechanical pull wire is reversely bent.

3. A combined indicating plate and pull wire as set forth in claim 2 wherein said cylindrical member has an axially extending aperture with a counterbored end for nesting the looped end of said double wire.

4. A combined indicating plate and pull wire as set forth in claim 2 wherein said cylindrical member has a transversely extending aperture through which the looped end of said wire extends for attachment to said cylindrical member.

5. A combined indicating plate and pull wire as set forth in claim 2 wherein said cylindrical member has spaced, longitudinally extending apertures through which said wire extends for attachment to said cylindrical member.

6. A combined indicating plate and pull wire as set forth in claim 2 wherein said cylindrical member has a longitudinally extending recess and a transverse aperture for receiving a pin to connect the looped end of said wire to said cylindrical member.

7. A combined indicating plate and pull wire as set forth in claim 2 wherein said cylindrical member has a longitudinally extending recess in one end thereof and said wire is disposed in said recess and attached thereto by a fastening member.

8. A combined indicating plate and pull wire comprising a cylindrical member having a flat end face adapted to receive indicia thereon indicating a passageway in the wall of a building for an electric wire, and a pull wire attached to said cylindrical member and extending through said passageway, said wire being adapted to be attached to an electrical conductor whereby said conductor can be pulled through said passageway.

9. A combined indicating plate and pull wire as set forth in claim 8 wherein said indicating plate is molded and one end of said pull wire is embedded therein.

10. A combined indicating plate and pull wire comprising a disc shaped, apertured indicating plate, and a pull wire extending through the aperture in said indicating plate, said indicating plate being exposed on a building element to indicate the presence of a passageway for an electric wire through which said pull wire extends, said wire being adapted to be attached to an electrical conductor whereby said conductor can be pulled through said aperture.

JOSEPH R. ENGLISH.

References Cited in the file of this patent

UNITED STATES PATENTS

| Number | Name | Date |
|---|---|---|
| 2,338,994 | Brittain | Jan. 11, 1944 |
| 2,519,876 | Berry | Aug. 22, 1950 |